(12) United States Patent
Bernstein et al.

(10) Patent No.: US 6,377,735 B1
(45) Date of Patent: Apr. 23, 2002

(54) FIBER RETAINING SYSTEM

(75) Inventors: Steven Bernstein, Jackson; Maurice E. Kordahi, Atlantic Highlands, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/399,751

(22) Filed: Sep. 21, 1999

(51) Int. Cl.$^7$ .............................. G02B 6/44; G02B 6/255
(52) U.S. Cl. .......................... 385/100; 385/95; 385/97; 385/98; 385/135
(58) Field of Search .................... 385/95, 100, 135, 385/97, 98, 99, 136, 137

(56) References Cited

U.S. PATENT DOCUMENTS

| | | | |
|---|---|---|---|
| 4,478,487 A | | 10/1984 | Obeissart .................. 350/96.21 |
| 4,507,008 A | | 3/1985 | Adl et al. |
| 5,642,451 A | * | 6/1997 | Kennedy ..................... 385/99 |
| 5,790,741 A | * | 8/1998 | Vincent ...................... 385/135 |
| 5,838,871 A | | 11/1998 | Libert et al. |
| 5,887,107 A | * | 3/1999 | Newman ..................... 385/137 |
| 6,116,793 A | * | 9/2000 | Finzel ......................... 385/99 |

FOREIGN PATENT DOCUMENTS

| | | | |
|---|---|---|---|
| EP | 0389206 | 9/1990 | ............ G02B/6/44 |
| GB | 2274175 | 7/1994 | ............ G02B/6/36 |

* cited by examiner

Primary Examiner—Loha Ben
Assistant Examiner—Michael A. Lucas

(57) ABSTRACT

An apparatus for retaining and protecting spliced optical fibers that are part of cables that have ultra-high strength steel wires, in which the optical fibers are free to move within a sleeve inside of the wires. The apparatus includes a joint box having opposing longitudinal cable termination ends. The high-strength steel wires of each cable are attached to a respective cable termination end. At least one optical fiber from each cable extends through its respective cable termination end and is spliced together to form a continuous optical fiber. The fiber or fibers are restrained at locations on the continuous optical fiber spaced from the splice by winding portions of the fibers around a friction imparting element, such as a drum, that includes a curved outer surface. Tension forces applied to the fiber or fibers are transferred to the drum. This arrangement immobilizes the optical fibers inside the joint box at a position spaced from the splice so that forces applied to the optical fibers are isolated from the spliced section. Additionally, this arrangement eliminates the large amount of slack of optical fiber that is normally used in a joint box and prevents the spliced optical fibers inside the joint box from moving in and out of their cables.

33 Claims, 3 Drawing Sheets

FIBER RETAINING SYSTEM

CROSS REFERENCE TO RELATED APPLICATIONS

This application is related to U.S. patent application Ser. No. 09/399,752, also entitled "Fiber Retaining System", filed simultaneously herewith, and which is hereby incorporated by reference.

FIELD OF THE INVENTION

The present invention relates to the retention and protection of loose spliced optical fibers. More specifically, the invention relates to a housing for containing and protecting a fiber optic splice and a portion of the optical fibers on opposite sides leading to the splice.

BACKGROUND OF THE INVENTION

Communications networks are frequently made of many miles of optical fibers. Indeed, many of the networks can extend between continents and across oceans and other large bodies of water. For protection, the optical fibers are contained in a larger cable. An example of such a prior art cable is shown in FIG. 1. The cable 2 includes an outer insulating plastic coating 4, a copper sheath 6 inside the outer coating 4, and high strength members, such as steel wires 8, inside of the copper sheath 6. A loose tube 10 is contained within the steel wires 8, and one or more isolated optical fibers 12 are contained within the loose tube 10. This permits the fibers 12 to move with respect to the steel wires 8, the sheath 6 and the coating 4. This cable arrangement has been found to be desirable in many high strength applications.

As neither the cables nor the fibers can be made and deployed in infinite lengths, sections of the cables and the fibers are attached together. The fibers are typically attached to each other by a process known as splicing. For protection from the environment, these spliced sections are commonly contained in a watertight housing, which is frequently referred to as a joint box. Such housings or joint boxes are also used when it is necessary to make splices in the field. In circumstances when tension is applied to the cable, such as during the deployment of the cable underwater by a ship, it is undesirable to have the splice absorb the applied tension forces or to have the spliced portion leave the joint box and go back inside the cable.

In a prior joint box design, the end portions of which are disclosed in U.S. Pat. No. 4,507,008, the high strength steel wires are clamped to a first end of a joint box between a socket body and a plug and sleeve arrangement. The plug and sleeve are hollow along their central axis and the fibers extend unrestrained therethrough. A similar arrangement exists at the other end of the joint box. A center section or shelf of the joint box extends between the cable termination end sections. The fibers are provided with a great deal of slack, such as three feet of fibers, and the ends of the fibers are fused. The joined fibers, with their slack, are coiled onto the center section. The splice itself is fixed within the center section. The large amount of slack is intended to enable the fused optical fiber to be pulled or tensioned without placing stress on the splice and without the splice being pulled into one of the cables.

However, a large amount of excess slack may be undesirable from an assembly standpoint. Further, when the excess slack is bent to fit within the housing, the fibers could become damaged. Additionally, in this arrangement, affixing the splice directly within the housing can also be undesirable because if the slack is removed, the stresses and strains are applied at the splice. Accordingly, a solution that overcomes the drawbacks of the prior art was needed.

SUMMARY OF THE INVENTION

In view of the foregoing, it is a principal object of the present invention to provide an arrangement for restraining and protecting spliced optical fibers in a joint box.

It is another object of the present invention to provide a housing or joint box that eliminates the large amount of slack of optical fiber that needs to be used inside.

It is yet another object of the present invention to immobilize the optical fibers inside a joint box at a position spaced from the splice so that forces applied to the optical fibers are isolated from the spliced section.

It is another object of the present invention to prevent the optical fibers inside the joint box from moving in and out of their cables.

These and other objects are achieved in accordance with the present invention by an apparatus having first and second cables, each having a strengthening portion and an optical fiber positioned inside of the strengthening portion. In each cable, each optical fiber is axially movable with respect to its respective strengthening portion and has a terminal end. The terminal ends of the optical fibers are spliced together at a splice location to form a continuous optical fiber. A housing includes opposed longitudinal end portions that are coupled to the strengthening portion of a respective cable. A fiber restraining device is spaced from the splice location and restrains the movement of the continuous optical fiber. The fiber restraining device may be a friction imparting element having a curved outer surface. An optical fiber is tensioned around the curved outer surface of the friction imparting element.

In another object, the present invention includes an apparatus having first and second cables, each having a strengthening portion and an optical fiber positioned inside of the strengthening portion. The optical fiber has a minimum bend radius at which the fiber will fail to reliably send optical signals thereon. The optical fiber is longitudinally movable with respect to its respective strengthening portion and has a terminal end. The terminal ends of the optical fibers are spliced together at a splice location to form a continuous optical fiber. A housing includes opposed longitudinal end portions and the strengthening portion of each cable is coupled to a respective end portion. The housing includes a friction imparting element having a curved convex surface having a radius of curvature not less than the minimum bend radius. The optical fiber is tensioned around the curved convex surface.

In an alternative object, the present invention includes an apparatus having first and second cables, each having a strengthening portion and an optical fiber positioned inside of the strengthening portion. In each cable, the optical fiber is longitudinally movable with respect to its respective strengthening portion and has a terminal end. The terminal ends of the optical fibers are spliced together at a splice location to form a continuous optical fiber. The housing includes opposed longitudinal end portions and a longitudinally extending divider separating the housing into first and second compartments. The housing is coupled to the strengthening portion of each cable. The housing further including first and second fiber restraining devices located in different compartments for restraining different portions of the continuous optical fiber.

In another object, the present invention includes an apparatus having first and second end portions, each having a cable attachment device. A fiber splicing region is disposed between the first and second end portions and can hold a spliced segment of a spliced fiber. First and second fiber retaining devices each include a drum having a curved outer surface adapted to impart friction to an optical fiber wound thereon. A fiber holdback device includes a concave surface that is substantially complimentary shaped to the curved outer surface. The fiber holdback device is positioned adjacent to a portion of the curved outer surface.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Figure 1:
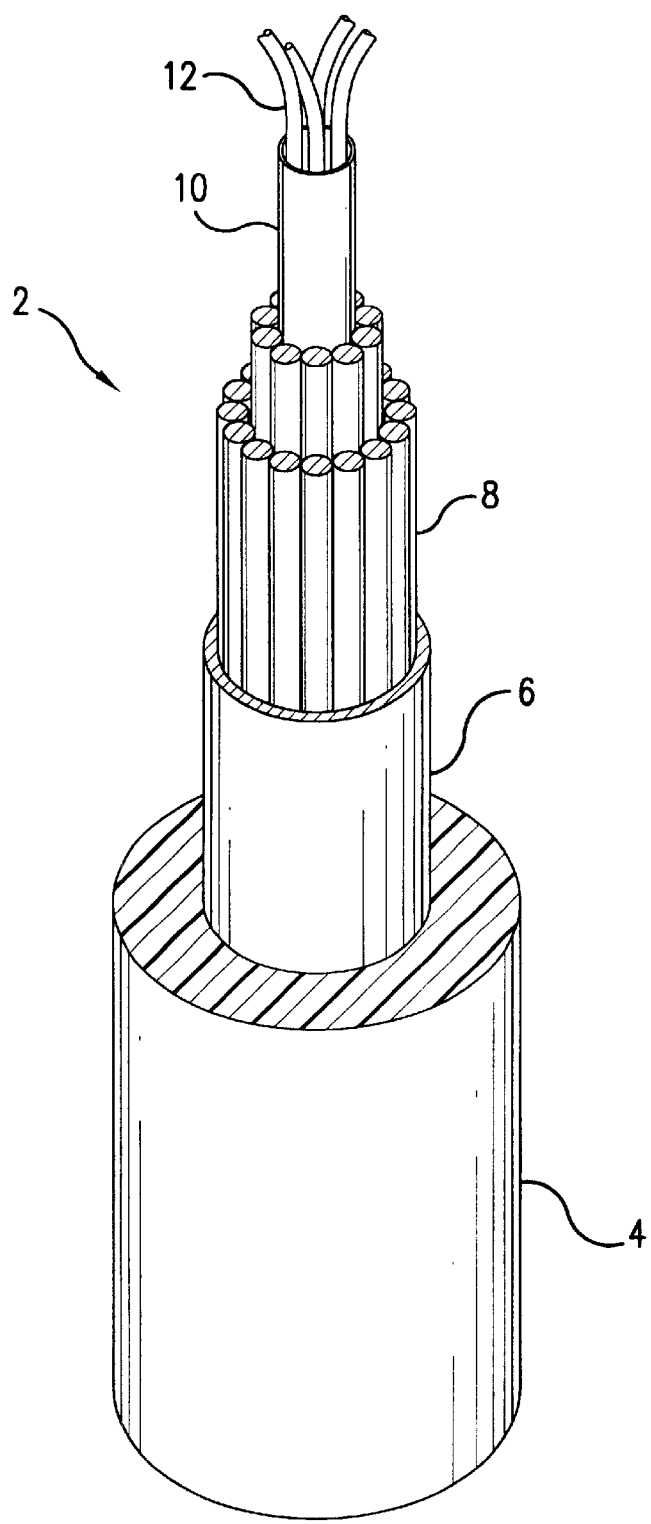
FIG. 1 is an isometric view of a prior art cable.
Figure 2:
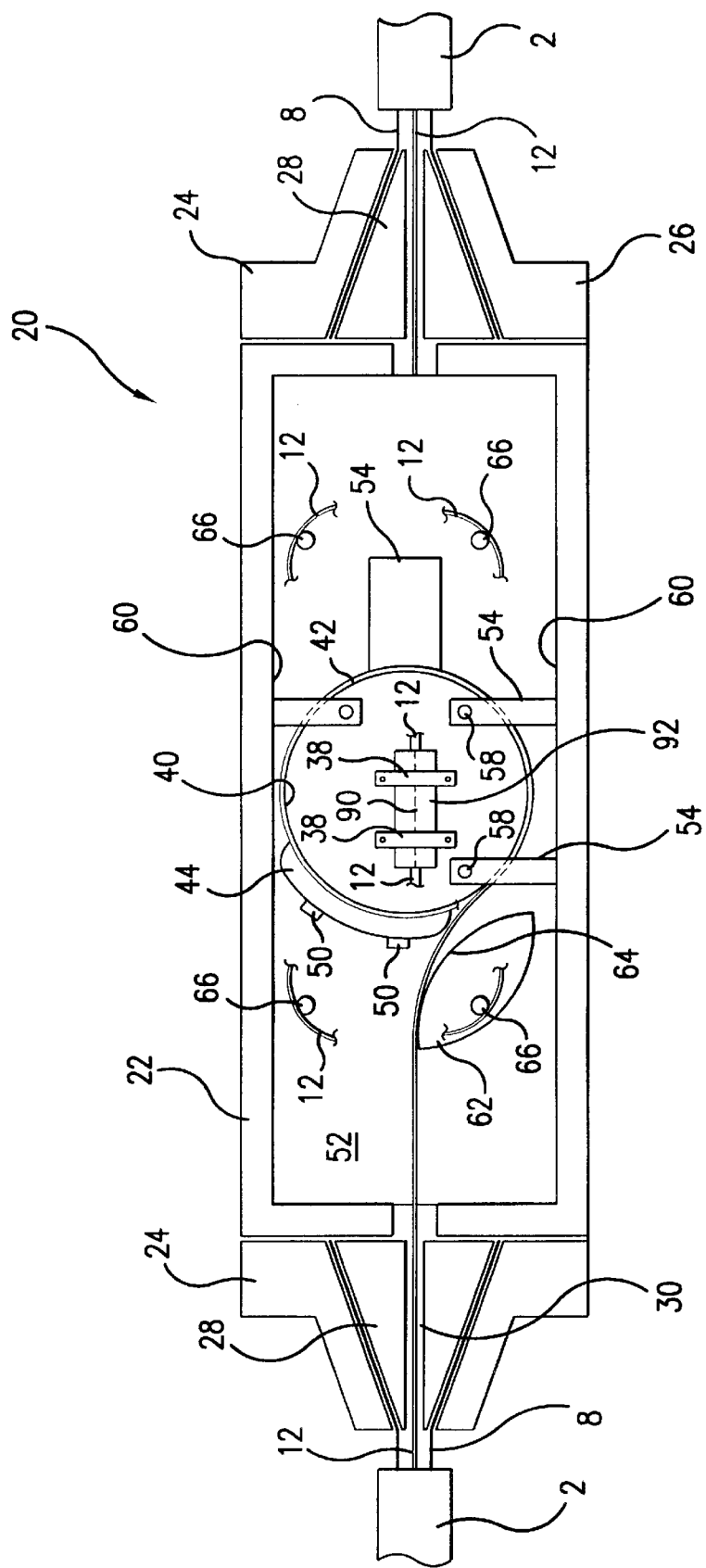
FIG. 2 is a schematic top view of the joint box and the cable of the present invention.
Figure 3:
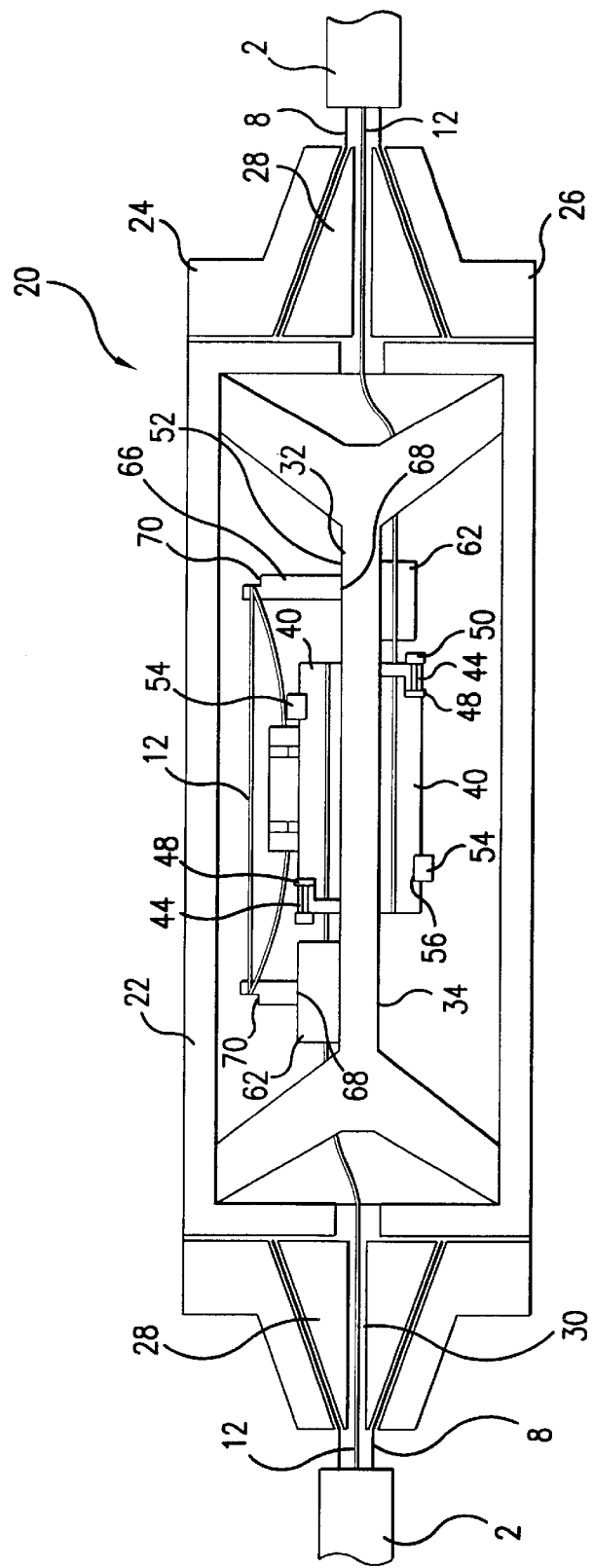
FIG. 3 is a schematic side sectional view of a portion the joint box and the cable of the present invention.

Details of the cable and fiber joining system for housing and protecting spliced optical fibers are shown in FIGS. 2 and 3. FIG. 2 schematically depicts the housing or joint box 20 connecting the free ends of two cables 2 together. The cables 2 are preferably of the type shown in FIG. 1 such that the optical fibers 12 can move longitudinally with respect to the remainder of the cable 2. The optical fibers 12 of the cables 2 are joined by a splice at splice location 90. As described below, the fibers 12 are restrained between the ends of the joint box 20 and the splice location 90. Preferably, the fibers 12 are restrained on both sides of the splice location 90 at a location spaced from the splice location 90. The fibers 12 are preferably restrained by the frictional resistance between the fibers 12 and the curved outer surface 42 of a restraining/friction imparting element such as a drum 40. A friction imparting element is herein defined as any structure having a surface upon which an optical fiber may be tensioned to effect frictional resistance therebetween. This eliminates the need to provide a significant amount of slack for the optical fibers 12. Moreover, it isolates the splice and the splice reinforcing device 92 from forces that are created when tension is applied to the fibers 12.

The joint box 20 includes cable termination sections 24 at its longitudinal ends, and a center section 22 disposed between, and connecting, the cable termination sections 24. Each cable termination section 24 includes a body 26 with a cone-shaped hollow cavity therein, and a cone-shaped plug and sleeve configuration 28 that fits within the hollow cavity. These elements function substantially as disclosed in U.S. Pat. No. 4,507,008, which is hereby incorporated by reference. In sum, the high strength steel wires 8 of the cables 2 are clamped between the hollow cavity of the body 26 and the plug and sleeve 28, and the outer surface of the sleeve is malleable which deforms around the high strength steel wire 8 as the plug is inserted. The body 26 and the plug and sleeve configuration 28 are hollow along their central axis 30. This enables the fibers 12 to extend unrestrained therethrough.

The center section 22 is disposed between and connected to the cable termination sections 24, and houses and protects the spliced section of the fibers 12. The center section 22 is attached to the cable termination sections 24 by any desirable arrangement, such as a "bayonette-type" locking arrangement as disclosed in copending U.S. patent application Ser. No. 09/399,752, also entitled "Fiber Retaining Device", which has been incorporated by reference herein. However, one of ordinary skill in the art will recognize that alternative attachment arrangements can be used in lieu of the "bayonette-type" locking arrangement.

The fibers 12 extend inwardly from the cable termination sections 24 and are wound around a curved outer surface 42 of an element, such as drum 40, that is immobile with respect to the joint box 20 and can bear the load of the fibers under tension. The fibers 12 preferably wrap around the curved surface 42 by an amount sufficient so that the frictional resistance between the fibers 12 and the outer surface 42 reduces- the amount of resultant force on the portion of the fibers 12 closer to the splice 90. In the specification below, the invention will generally be described in conjunction with the use of a single fiber 12. However, multiple fibers 12 can be wrapped around the drum 40 and spliced together at splice 90. If multiple fibers 12 are used, it is preferred that the fibers 12 are ribbonized, at least in the region where the fibers 12 are wrapped around the drum 40, to facilitate assembly and to minimize the possibility that the fibers 12 crossover one another.

A fiber holdback device 44 is positioned horizontally adjacent the drum 40 to prevent the fiber 12 from slipping off of the drum 40 in the absence of tension applied to the fibers 12. Fiber holdback device 44 preferably includes a concave surface 46 that approximates the convex shape of the curved outer surface 42 of drum 40 as it permits a holding force to be applied over a wider area of the fiber. However, the shape of the surfaces 42 and 46 need not be complimentary. A compressible member such as a rubber pad, not shown, may be attached to the concave surface 42 to prevent the fiber holdback device 44 from biting into the fiber 12. As shown in FIG. 3, the fiber holdback device 44 may also include an overhang or ledge 48 that extends laterally from the concave surface 42 over a portion of the drum 40 where the fiber 12 is wrapped. This will help prevent the fiber 12 from moving off of the drum 40 when the fiber 12 is not in tension.

A position adjusting device, such as adjustment screws 50, may be used to properly position the fiber holdback device 44 relative to the drum 40.

In a preferred embodiment, the center section 22 includes a shelf 52 that generally divides the center section 22 into upper and lower compartments or sections 32 and 34, as shown in FIG. 3. In such an arrangement, a drum 40 and a holdback device 44 can be included on both the upper and lower sides 32 and 34 of the shelf 52. If a shelf 52 is provided, the section of the fiber 12 entering the center section 22 from one end is wound around a curved surface 42 of the drum 40 on the upper side of the shelf 52, and the section of the fiber 12 entering the center section 22 from the other end is wound around the curved surface 42 of drum 40 on the lower side of the shelf 52. The shelf 52 includes at least one opening 54 that enables a wound fiber 12 to pass from one side of the shelf 52 to the other side, e.g., the lower side 34 to the upper side 32. This enables the ends of the sections of fiber 12 to be positioned on the same side of shelf 52 to facilitate splicing. However, it is recognized that a shelf 52 need not be provided and that a single curved surface 42 on a single drum 40 may be used so that both incoming sections of the fiber 12 can be wrapped around the curved outer surface 42.

In a first embodiment, as shown, the drums 40 on both sides of the shelf 52 could be formed from separate drum elements attached to opposite sides of the shelf 52. In the alternative, the drums 40 could be created by a single drum element extending through the shelf 52 yielding curved outer surfaces 42 above and below the shelf 52. In another alternative arrangement, the drums 40 could be formed unitary with the shelf 52.

As shown in FIG. 2, fiber blocking devices 54 are attached to the drum 40 and extend laterally over a portion of the drum 40 where the fiber 12 is wound. The fiber blocking devices 54 are radially spaced around the drum 40 and preferably take the shape of bars and span the gap between the outer surface 42 of the drum 40 and the inner wall 60 of the center section 22 proximate the drum 40. The surface 56 of the fiber blocking devices 54 that faces the shelf 52 will help prevent the fiber 12 from moving off of the drum 40 in the absence of a tensile force being applied to the fiber 12. The fiber blocking devices 54 are preferably removable to facilitate the winding of the fiber 12 around the drum 40. However, forming the fiber blocking devices 54 as part of the shelf 52 is also contemplated by the present invention. A preferred arrangement to provide this removable attachment capability is by using attachment screws 58 that extend through the fiber blocking devices 54 and are threaded into respective holes, not shown, in the upper surface of the drum 40. Fiber blocking devices 54 are not needed in the areas near the fiber holdback device 44 as the horizontal ledge 48 of the fiber holdback device 44 performs a similar function in that region.

On possible point of failure that exist in all joint boxes is that the fiber 12 may be bent and exceed its critical bending radius (a maximum limit) causing a signal sent thereon not to be properly transmitted. To prevent such an occurrence, the outer surface 42 of the drum 40 has a radius which is greater than the critical bending radius of the fiber 12. The critical bending limit for many fibers is about 30 mm. Accordingly, the radius of the outer surface 42 of drum 40 preferably exceeds 30 mm.

To further control the routing of the fiber 12, a fiber bend limiter 62 is positioned between the location where the fiber 12 enters the center section 22 from the cable termination section 24 and the drum 40. The fiber bend limiter 62 preferably includes a curved outer guiding surface 64 that faces the drum 40. The fiber bend limiter 62 will also inherently reduce the tension force on the fiber 12 due to the frictional resistance between the fiber 12 and outer surface 64.

Additionally, the joint box 20 includes pins 66 for coiling a small amount of slack of the fiber 12 to enable the fiber 12 to easily be spliced. The pins 66 include a bottom end 68 attached to the shelf 52, the fiber bend limiter 62, or another fixed element in the center section 22 to properly locate the pins 66. A horizontal ledge 70 may be formed in each pin 66 adjacent its upper end to facilitate the coiling of the sections fiber 12. If a center shelf 52 is used, the fiber section on one side may also be loosely coiled around the pins 66 prior to the splice 90. If desired, pins 66 may also be provided on the side of the shelf 52 without the splice 90, so that the section of fiber 12 may be coiled on that side of the shelf 52 prior to it passing through opening 54.

The fibers 12 are spliced together at splice location 90. The splice 90 is typically protected by a splice reinforcing device 92 which may be mass fusion splint or another structure known for strengthening the splice region. The "spliced region" for spliced fibers is herein defined as the splice itself and a small distance on either longitudinal side of the splice that is used for strengthening the splice. The splice reinforcing device 92 may rest upon and be attached to the upper surface 72 of the drum 40. Further, one or more restraints 38, which may take any form, are preferably used to fix the splice reinforcing device 92 to the upper surface 72 of drum 40. This prevents excess movement of the spliced region of the optical fibers 12.

Figure 4:
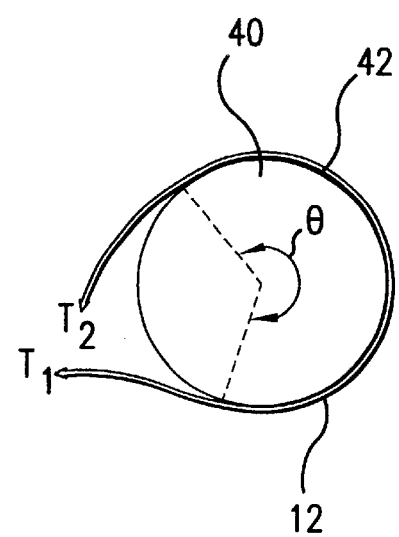
FIG. 4 is a diagram depicting the transfer of a tension force applied to a fiber that is wrapped around the drum.

The functionality of the drum 40 will be described in conjunction with FIG. 4. The incoming fiber 12 is wound around the curved outer surface of the drum 40. When a tension force $T_1$ is applied to the end of the fiber 12, a reduced tension force $T_2$ is transferred to the fiber 12 at its other end where it departs from the drum 40. The reduced force is due to the frictional resistance of the fiber 12 on the drum 40. The amount of the frictional resistance, and in turn, the reduced tension force $T_2$, will depend upon the coefficient of friction $\mu$ between the fibers 12 and the band 40 and the angle $\Theta$ subtending the arc of contact between the fiber 12 and the drum 40. The relationship between the tension forces $T_1$ and $T_2$ is governed by the following known equation:

$$T_1 = T_2 * e^{\mu\Theta}$$

where $e$ is the base of the naparian system of logarithms (approximately 2.178). Thus, assuming a coefficient of friction of 0.5 and a wrap angle of 270 degrees, the tension force $T_2$ can be reduced by a factor of 10.54 with respect to $T_1$. Thus, if a tension force $T_1$ of 10 lbs. is applied, the resulting tension on the fiber 12 as it departs from the drum 40 is 0.95 lbs. (0.95=10/10.54). This is a force that can easily be absorbed by the fiber 12 itself. Using the same coefficient of friction, a wrap angle of 180 degrees reduces $T_2$ by a factor of 4.81 with respect to $T_1$, and a wrap angle of 90 degrees reduces $T_2$ by a factor of 2.19 with respect to $T_1$. Preferably, the curved outer surface 42 is coated or covered by a material, such as rubber, to increase the coefficient of friction $\mu$ between the fibers 12 and the band 40. In turn, this will further decrease tension force $T_2$.

To make the assembled cable and fiber unit with the joint box 20, the ends of two cable sections are attached to the cable termination sections 24 as described above. If the joint includes more than one fiber 12, at least a portion of the fibers 12 are aligned and ribbonized by applying a glue. The ribbonized portion should at least approximately cover the area where the fibers 12 are wound around the drum 40. On one side of the shelf 52, the fiber 12 is routed along the curved guiding surface 64 of fiber bend limiter 62 and along the outer surface 42 of drum 40 to control the bending of the fiber 12. The fiber 12 is wound around the outer surface 42 of drum 40 and the fiber holdback device 44 is positioned to prevent the fiber 12 from backing off of the outer surface 42 of drum 40. Preferably, the fiber holdback device 44 applies a very slight clamping force to the fiber 12 only to prevent the optical fiber 12 from coming off of the drum 40 in the absence of an applied tension force. The fiber blocking elements 54 may then be positioned and attached to prevent the fiber 12 from coming off of the drum 40 in specific regions in the absence of an applied tension force. A small amount of slack in the optical fiber 12 between its position at the fiber holdback device 44 and its intended point of splice is provided. This slack can be loosely coiled around pins 66.

The process is repeated on the other side of the shelf 52 with the fiber-portion entering from the other side of the joint box 20 except that the fiber extends through opening 54 in shelf 52 so as to be placed on the same side of the shelf 52 with the other fiber portion. The splice 90 is accomplished in any well known manner and preferably a splice reinforcing device 92 is provided. The splice reinforcing device 92 may be fixed to the upper surface 72 of drum 40 by splice restraints 38 such as brackets. Finally, a metal cover, not shown, is attached around the center section 22, and a plastic sleeve, also not shown, may sealingly surround the entire joint box 20 in a conventional manner for waterproofing purposes.

Thus, as installed, the fiber 12 is wrapped around a curved surface 42 having a radius that is larger that the critical bend radius of the fiber itself. This significantly reduces the amount of tension force on the fiber and isolates any forces applied to the fiber from the splice. Thus, when a pulling or tension force on the optical fiber 12 is created, it is reduced by the frictional resistance between the fiber 12 and the drum 40. The tension forces are not likely to create any slippage between the fiber 12 and the drum 40, and therefore, the fiber 12 is prevented from moving into the cable 2. Additionally, due to the relationship between the fiber 12 and the drum 40, the region of the splice 90 is effective isolated from these tension forces.

It is understood that while the invention depicts and describes a single optical fiber 12 in the cable 2, the invention works similarly and is applicable for use with a cable having multiple optical fibers. Further, while the drum 40 is shown with a radial outer surface 42, a circular perimeter is not required as the governing limitation is the bend radius of the fiber 12 as wound on the drum 40. Thus, numerous alternate shapes and contours could be used. Additionally, the splice 90 need not be attached in the location or orientation as shown and any convenient location or orientation may be used as the forces applied to the fiber 12 are effectively isolated from the splice.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. An apparatus comprising:
   first and second cables, each cable having a strengthening portion and an optical fiber positioned inside of the strengthening portion, each said optical fiber being longitudinally movable with respect to its respective strengthening portion, each said optical fiber having a terminal end; and
   a housing, said housing including opposed first and second longitudinal end portions, said first longitudinal end portion of the housing being coupled to the strengthening portion of the first cable, said second longitudinal end portion of the housing being coupled to the strengthening portion of the second cable, said housing further including a friction imparting element having a curved outer surface arranged to provide a holding force over an area of the fiber wherein said optical fiber of said first cable is tensioned around the curved outer surface of the friction imparting element, said terminal ends of the optical fibers being spliced together at a splice location to form a continuous optical fiber.

2. The apparatus of claim 1, further comprising a fiber holdback device positioned adjacent said curved outer surface, said tensioned optical fiber of the first cable routed between the curved outer surface and the fiber holdback device.

3. The apparatus of claim 2, wherein said fiber holdback device includes a concave surface substantially complimentary shaped to an adjacent portion of the curved outer surface.

4. The apparatus of claim 3, wherein the tension imparting element is a generally-cylindrical shaped drum.

5. The apparatus of claim 4, wherein said tensioned optical fiber is tensioned around the curved outer surface for at least 180 degrees of said drum.

6. The apparatus of claim 1, further comprising a splice reinforcing device positioned at the splice location, said splice reinforcing device attached to said tension imparting element.

7. The apparatus of claim 6, wherein said first and second cables each includes a plurality of optical fibers positioned inside the strengthening portion of their respective cable, said optical fibers each being longitudinally movable with respect to the strengthening portion of their respective cable, each said optical fiber having a terminal end, said terminal end of each optical fiber of the first cable being spliced together at a splice location with said terminal end of a respective optical fiber of the second cable to form a continuous optical fiber, wherein at least a portion of each continuous optical fiber is ribbonized with the other continuous optical fibers.

8. The apparatus of claim 1, said apparatus further comprising an optical fiber bend limiter, said optical fiber bend limiter in contact with said tensioned fiber, and positioned between said curved outer surface and said first longitudinal end portion.

9. The apparatus of claim 8, further comprising a fiber holdback device positioned adjacent said curved outer surface, said tensioned optical fiber of the first cable routed between the curved outer surface and the fiber holdback device, wherein said fiber holdback device includes a concave surface substantially complimentary shaped to an adjacent portion of the curved outer surface.

10. The apparatus of claim 1, wherein said tensioned optical fiber is tensioned around the curved outer surface for at least 90 degrees of said element.

11. The apparatus of claim 1, wherein said tensioned optical fiber is tensioned around the curved outer surface for at least 180 degrees of said element.

12. The apparatus of claim 1, wherein said tensioned optical fiber is tensioned around the curved outer surface for at least 270 degrees of said element.

13. The apparatus of claim 1, wherein said friction imparting element is a first friction imparting element, said apparatus further comprising a second friction imparting element having a curved outer surface, the optical fiber of the second cable being tensioned around the curved outer surface of the second friction imparting element.

14. The apparatus of claim 13, further comprising a longitudinally-oriented shelf dividing the housing into first and second compartments, said first friction imparting element located in said first compartment and said second friction imparting element located in said second compartment.

15. The apparatus of claim 1, wherein said outer surface of said friction imparting element is coated with a friction increasing material.

16. An apparatus comprising:
   first and second cables, each cable having a strengthening portion and an optical fiber positioned inside of the strengthening portion, each said optical fiber being longitudinally movable with respect to its respective strengthening portion, each said optical fiber having a terminal end, each said optical fiber including a minimum bend radius at which the fiber will fail to reliably send optical signals thereon; and
   a housing, said housing including opposed first and second longitudinal end portions, said first longitudinal end portion of the housing being coupled to the strengthening portion of the first cable, said second longitudinal end portion of the housing being coupled to the strengthening portion of the second cable, said housing further including a friction imparting element arranged to provide a holding force over an area of the fiber having a curved convex surface having a radius of curvature not less than said minimum bend radius, said optical fiber of said first cable being tensioned around the curved convex surface, said terminal ends of the optical fibers being spliced together at a splice location to form a continuous optical fiber.

17. The apparatus of claim 16, wherein said tensioned optical fiber of the first cable is tensioned around the curved convex surface for at least 180 degrees of said friction imparting, element.

18. The apparatus of claim 16, wherein said tensioned fiber optical fiber of the first cable is tensioned around the curved convex surface for at least 270 degrees of said friction imparting element.

19. An apparatus comprising:

first and second cables, each cable having a strengthening portion and an optical fiber positioned inside of the strengthening portion, each said optical fiber being longitudinally movable with respect to its respective strengthening portion, each said optical fiber having a terminal end;

a housing, said housing including opposed first and second longitudinal end portions, said first longitudinal end portion of the housing being coupled to the strengthening portion of the first cable, said second longitudinal end portion of the housing being coupled to the strengthening portion of the second cable, said housing further including a longitudinally extending divider separating the housing into first and second compartments, and said housing further including first and second fiber restraining devices, said first fiber restraining device located in said first compartment and restraining a portion of the optical fiber from the first cable, said second fiber restraining device located in said second compartment and restraining a portion of the optical fiber from the second cable, said terminal ends of the optical fibers being spliced together in a splice at a splice location to form a continuous optical fiber.

20. The apparatus of claim 19, wherein said first and second fiber restraining devices having a curved outer surface, said optical fiber of the first cable being tensioned around the curved outer surface of the first fiber restraining device, and said optical fiber of the second cable being tensioned around the curved outer surface of the second fiber restraining device.

21. The apparatus of claim 20, wherein said first and second fiber restraining device each includes a fiber holdback device positioned adjacent its respective said curved outer surface.

22. The apparatus of claim 21, wherein each said first and second fiber restraining device each include a generally-cylindrical shaped drum that includes its curved outer surface.

23. The apparatus of claim 22, further comprising a first optical fiber bend limiter contacting said tensioned optical fiber of the first cable between said first longitudinal end and said first optical fiber restraining device, and second optical fiber bend limiter contacting said tensioned optical fiber of the second cable between said second longitudinal end and said second fiber restraining device.

24. The apparatus of claim 22, wherein said optical fiber of said first cable is tensioned around the curved outer surface of the first optical fiber restraining device for at least 180 degrees, and said optical fiber of said second cable is tensioned around the curved outer surface of the second optical fiber restraining device for at least 180 degrees.

25. The apparatus of claim 24, wherein said curved outer surfaces are coated with a friction increasing material.

26. The apparatus of claim 19, further comprising a splice reinforcing device positioned at the splice location, said splice reinforcing device being mounted to said first fiber restraining device.

27. An apparatus for attaching first and second cables each having at least one optical fiber loosely contained therein, said apparatus comprising:

a first end portion, said first end portion having a cable attachment device;

a second end portion, on the opposite side from the first end portion, said second end portion also having a cable attachment device;

a drum having a curved outer surface, said drum adapted to impart friction to an optical fiber wound thereon; and a fiber holdback device positioned adjacent to a portion of said curved outer surface, said fiber holdback device having a concave surface substantially complimentary shaped to its adjacent portion of the curved outer surface and arranged to provide a holding force over an area of the fiber.

28. The apparatus of claim 27, further comprising a shelf dividing the housing into first and second compartments, said drum and said fiber holdback device being located in said first compartment, said apparatus further comprising a second drum and a second fiber holdback device, said second drum and said second fiber holdback device being located in said second compartment.

29. The apparatus of claim 27, wherein said outer surface of said drum is coated with a friction increasing material.

30. A method for attaching fibers within a housing comprising:

providing first and second cables, each cable having a strengthening portion and an optical fiber positioned inside of the strengthening portion, each optical fiber being longitudinally movable with respect to its respective strengthening portion, and each said optical fiber having a terminal end;

providing a housing including opposed first and second longitudinal end portions and a friction imparting device having a curved outer surface arranged to provide a holding force over an area of the fiber;

coupling the strengthening portion of each respective cable to a respective end portion of the housing;

tensioning the optical fiber of the first cable by winding it around the curved outer surface of the friction imparting device; and splicing the terminal ends of the optical fibers together at a splice location to form a continuous optical fiber.

31. The method of claim 30, wherein said friction imparting device is a first friction imparting device, said method further comprising the steps of:

providing a second friction imparting device; and tensioning the optical fiber of the second cable by winding it around the curved outer surface of the second friction imparting device.

32. The method of claim 30, further comprising the step of:

preventing the optical fiber of the first cable from slipping off of the curved outer surface in the absence of tension by from lightly clamping the optical fiber of the first cable between the curved outer surface and a fiber holdback device.

33. The method of claim 30, wherein said tensioning step includes winding the optical fiber of the first cable at least 180 degrees around the curved outer surface.

* * * * *